United States Patent Office 3,099,623
Patented July 30, 1963

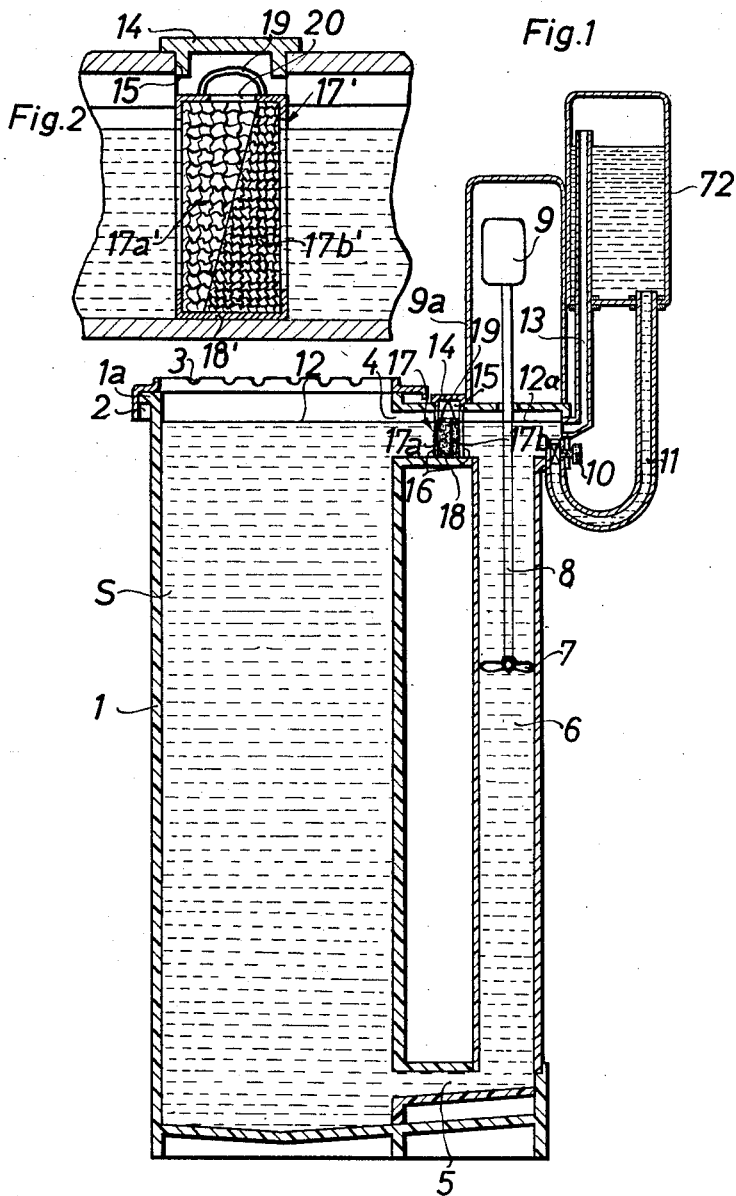

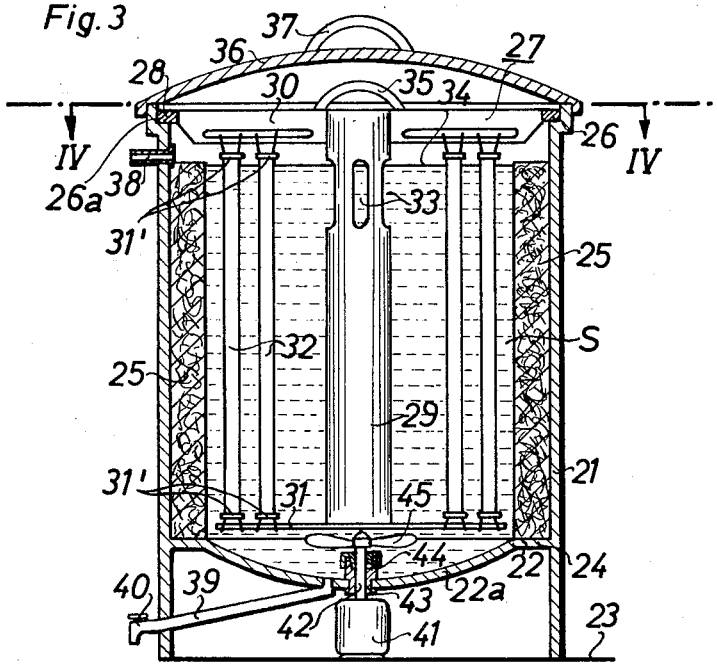
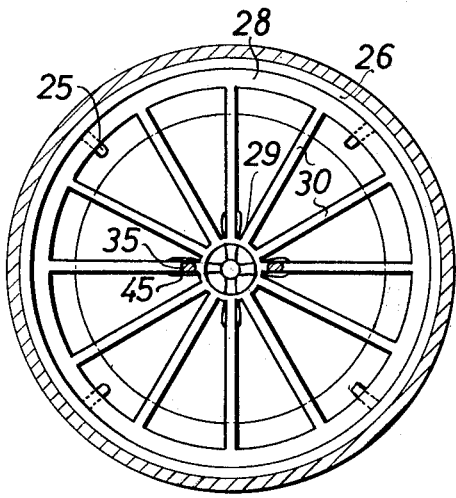
INVENTOR.
HELMUT KÄUFER

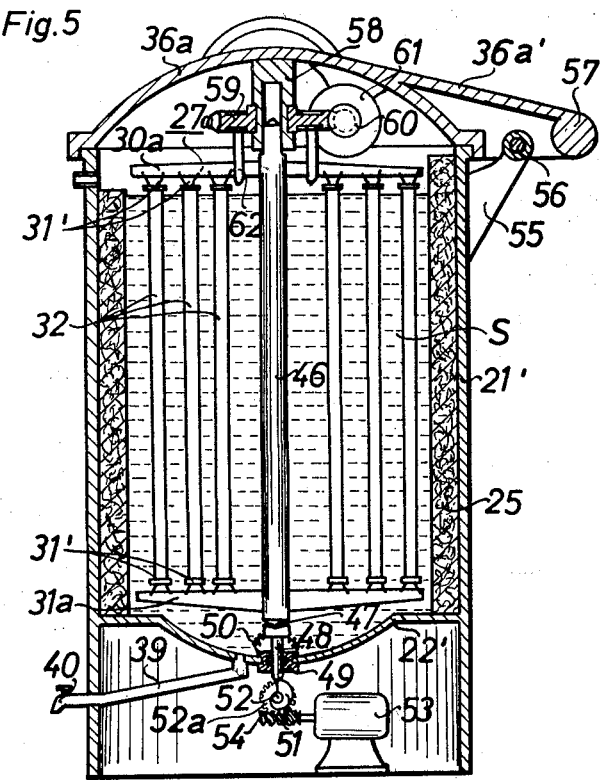
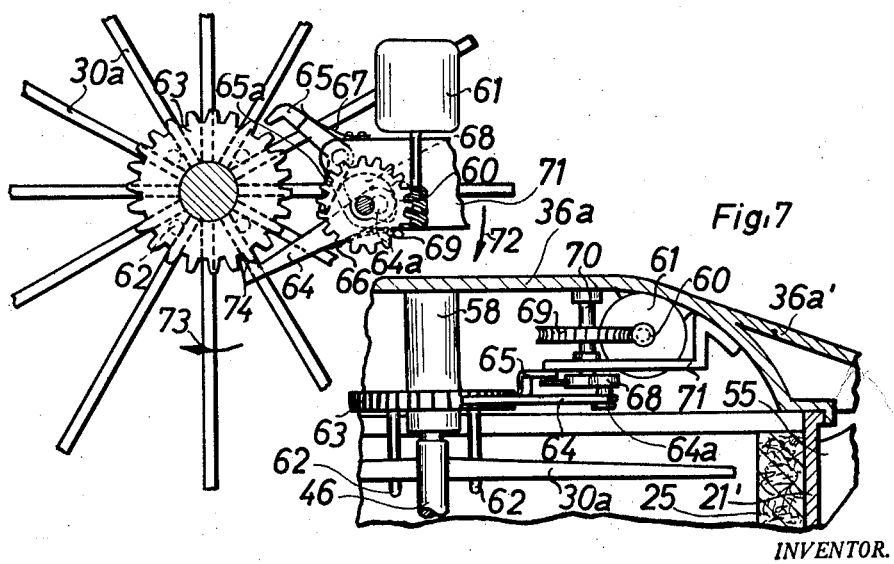

3,099,623
PROCESS AND APPARATUS FOR THE SEPARATION OF SOLID PARTICLES FROM DEVELOPING SOLUTIONS FOR EXPOSED FILMS AND THE LIKE
Helmut Käufer, Munich-Grunwald, Germany, assignor to Agfa A.G., Leverkusen, Germany
Filed Aug. 19, 1959, Ser. No. 834,762
Claims priority, application Germany Sept. 22, 1958
13 Claims. (Cl. 210—167)

The present invention relates to a process and apparatus for at least partially removing solids from solutions in developing tanks for exposed films, plates, papers and the like.

In the treatment of exposed photographic films, plates and other materials which are coated with a photosensitive layer, certain reaction products and gelatine derivatives accumulate in the solution which fills the developing tank. Such solids usually concentrate at the tank bottom in the form of fine sludge or mud. As the concentration of solids in the developing solution increases, the sludge agglomerates into a number of flakes which often adhere to the negatives.

It was already proposed to prevent excessive concentration of finely distributed solid matter in a developing tank by evacuating the developing solution at a point in the lower tank zone, by thereupon filtering the solution, and by returning the filtered solution into the upper tank zone. The solution is evacuated into a funnel and thereupon passes through a sludge extractor, such as a sieve or the like. After passing through the extractor, the partially filtered developing solution is collected in a second funnel wherein the remaining solids may settle at the bottom to be periodically withdrawn by opening a faucet or the like. The solution accumulating in the second funnel is thereupon returned into the upper zone of the developing tank. The disadvantages of such systems is in that a current or stream is formed between the points of return flow and discharge of liquid in the tank, and that the less agitated strata of developing solution in the tank retain high concentrations of solid particles. In fact, such systems are capable of removing only a small percentage of reaction solids from the developing solution. In addition, the just described systems require considerable quantities of developing fluid, and a high percentage of still usable fluid is lost when the agglomerated solids are withdrawn from the aforementioned second funnel. Thus, such systems constantly utilize considerable quantities of developing fluid in addition to that filling the developing tank, which results in rather uneconomical operation.

It was further proposed to remove the solids from a developing solution by the provision of a recirculating conduit and by the provision of a suitable pumping device which causes the developing solution to pass through the conduit and through a filter in the latter before returning into the developing tank, whereby the filter collects the sludge entrained by the pumped fluid. It was heretofore considered necessary that the filters should offer considerable resistance to the flow of developing solution therethrough and that, consequently, the solution must be subjected to comparatively high pressures. A filter of fine mesh will become clogged after short periods of actual use and, therefore, require frequent interchange and cleaning which, in turn, necessitates that the recirculation of developing solution be interrupted at frequent intervals. If the filters are not exchanged in time, the sped of flow of the circulating solution drops very rapidly which brings about a corresponding drop in the intensity and quality of processing treatment to which the films, plates and the like are subjected in the tank.

An important object of the present invention is to provide a process and an apparatus for removing at least a certain percentage of solid matter from developing solutions without in any way interrupting the treatment of exposed material in a developing tank.

Another object of the invention is to provide a process for removing all larger and a certain percentage of smaller solid particles from a developing solution which may be practiced with developing tanks of rectangular, cylindrical and many other designs.

A further object of the instant invention is to provide a process of the above outlined characteristics which is very economical in that no or only small quantities of developing solution in excess of that filling the developing tank are required for its practice.

An additional object of the invention is to provide a process of the above outlined characteristics which takes advantage of exposed films, plates and the like as a means contributing to the separation of solids from the developing solution.

Still another object of the present invention is to provide a process as above set forth according to which the solid matter accumulating on and adhering to the exposed films or plates immersed in the developing solution may be removed simultaneously with removal of solids from the developing solution.

A further object of the invention is to provide a process for at least partially removing solid particles from a developing solution without subjecting the solution to any or only to very moderate pressures.

An additional object of the invention is to provide a process of the above outlined characteristics which insures that the intensity and quality of treatment to which the exposed material is subjected in the continuously purified developing solution remains unchanged for long periods of time.

A concomitant object of the present invention is to provide a process as above set forth according to which the useful life of a developing solution is extended for considerable periods of time without in any way affecting the effectiveness of the solution.

An additional object of the present invention is to provide various forms of apparatus for carrying out the method just referred to in a simple, efficient and economical manner.

A still further object of the invention is to provide an apparatus for the practice of the above outlined process which is capable of removing impurities from a developing solution by simultaneously moving the developing solution in more than one direction and without subjecting the solution to excessive pressures.

A yet further object of the invention is to provide an apparatus as above outlined in which the solids-collecting filtering means may be removed or exchanged without interrupting the purification and circulation of the developing solution.

An additional object of the invention is to provide an apparatus as above set forth which may be readily installed in many presently utilized developing tanks.

A more specific object of the present invention is to provide an improved composite filter for use in the above described apparatus.

The present invention is based on the recognition that it is entirely satisfactory to remove all comparatively large solid particles or flakes from the developing solution, and to maintain the percentage of finer solids or sludge below a certain limit. The novel process comprises essentially the steps of recirculating the developing solution in, or externally of, the developing tank by causing the solution to flow at a speed of between 0.5–5 cm. per second, and of simultaneously subjecting the moving solution to nearly pressureless filtering action of filters with a mesh in the range of between 0.2–5 mm. which is sufficient to remove at least a certain percentage of entrained solid particles, the percentage of removed solid matter being high enough to insure full effectiveness of the developing solution.

According to one modification of my novel method, a certain quantity of solution is continuously withdrawn from the developing tank, is then subjected to practically pressureless filtering action of one or more comparatively coarse filters, and is thereupon returned into the tank. Alternately, the entire liquid contents of the developing tank may be continuously convoluted or revolved and simultaneously subjected to the filtering action of one or of a series of filtering units which are installed in the tank proper. The exposed films or like materials immersed into the developing solution may be subjected to a vibrating or pulsating action while the solution is circulated in order to shake off any flakes or sludge particles which might adhere thereto.

The novel method possesses all advantages of presently utilized processes, i.e. despite the fact that the filtering of developing solution occurs at insignificant pressures, all solids which could adversely influence the action of the solution upon the exposed films and the like are effectively removed and the intensity of treatment remains practically unchanged for long periods of time. The developing solution is fully utilized to insure a long-lasting and very economical operation. In addition, the novel process avoids all disadvantages of conventional methods which are based on recirculation of developing solutions at high pressures, i.e. the novel process may remain continuous, the filters may be interchanged without disturbing the treatment of exposed material, and the power consumption necessary to remove solids from the solution is much lower than in presently utilized processes. In fact, the solution may be recirculated at the above indicated speed of 0.5–5 cm. per second in and/or externally of the tank without utilizing a regular pumping device but merely by a rotating screw or by rotating the exposed films in the developing tank.

In one of its preferred embodiments, the apparatus for the practice of my method may comprise a system of channels connected with the developing tank and at least one filtering unit in at least one of the channels through which the solution is caused to pass at insignificant pressures by a propeller screw or the like. The filtering means may consist of a unitary structure, or it may comprise several layers of comparatively coarse mesh with a mesh size of between 0.2–5 mm. and of different permeability. It is preferred to install the filtering means at the upper level of the solution so that the latter may overflow and continue its circulatory motion even if the filtering means should become completely clogged by the solids which it removes from the passing solution.

According to another modification of my invention, the apparatus may comprise a cylindrical tank containing one or more radially arranged filtering units of comparatively coarse mesh, and means for imparting a rotary motion to the solution which fills the tank, whereby the solution is caused to repeatedly pass through each filtering unit. Alternately, the solution may be set in rotary motion to pass through one or more radially arranged filters in the developing tank by imparting a rotary motion to the insert which supports the exposed films, plates and the like when the later are immersed in the developing solution. The insert is preferably rotated by means of an automatically separable coupling assembly one half of which may be installed in the tank cover and is rotated by an electric motor or the like to impart rotary motion to a component part of the insert which part constitutes the second half of the coupling assembly.

It is further preferred to subject the exposed films and like materials to a pulsating or vibrating force, for example, by providing a second drive means at the bottom of the developing tank which reciprocates the insert in vertical direction whereby to shake off the solids, accumulating on and adhering to the exposed films. Alternately, the means which rotates the insert in the developing tank may be modified in such a way as to intermittently advance the insert at shorter or longer intervals. Whenever the insert is set in motion or brought to a halt, it experiences a shock sufficient to shake the solids off the exposed material immersed in and treated by the circulating developing solution.

The novel features which are considered as characteristic for the invention are set forth in particular in the appended claims. The invention itself, however, both as to its construction and its method of operation, together with additional objects and advantages thereof will be best understood from the following description of certain specific embodiments when read in connection with the accompanying drawings, in which:

FIG. 1 is vertical section through one form of a developing tank combined with circulation producing and filtering means for removing solids from the developing solution;

FIG. 2 is an enlarged vertical section through a slightly modified filter assembly which may be utilized in the tank of FIG. 1;

FIG. 3 is central vertical section through a modified tank of cylindrical contour which embodies means for circulating and filtering the developing solution;

FIG. 4 is a horizontal section taken on the line IV—IV of FIG. 3, as seen in the direction of arrows;

FIG. 5 shows a third modification of the developing tank in which the developing solution is set in rotary motion by the exposed films or the like, and in which the immersed material simultaneously performs a vibratory motion;

FIG. 6 is an enlarged top plan detail view of a slightly modified vibrating or shaking and rotating mechanism for use in the tank of the type shown in FIG. 5; and FIG. 7 is a side elevational view of the structure shown in FIG. 6.

Referring now in greater detail to the drawings, and first to the embodiment shown in FIG. 1, the developing tank 1 which may be of rectangular contour has an open upper end whose flange supports an insert or carrier 2 for supporting films, papers or other bodies coated with an exposed photosensitive layer (not shown). The non-represented holders may be inserted into the recesses or notches 3 formed in the member 2. At is upper end, the tank 1 communicates with a vertical bypass or circulating channel 6 over a horizontal discharge channel 4, and the lower end of tank 1 is communicatively connected with the upright channel 6 by a second transverse or return channel 5. Channels 4, 5 and 6 constitute a composite passage for recirculating the developing solution S from the top to the bottom zone of developing tank 1. The output shaft 8 of an electric motor 9 extends into the bypass channel 6 and carries at its lower end a motion generating means here shown as a propeller blade or screw 7. The upper end of channel 6 communicates with a conduit 11 over a throttle or choke valve 10, and with a scond conduit 13. Conduit 11 communicates with the lower zone of an airtight sealed receptacle 72 which contains a supply of regenerating solution. The second conduit 13 communicates with the upper zone of the receptacle 72 above the liquid level therein. This latter conduit or tube 13 has its lower end substantially flush with the liquid level 12a of the developing solution S in the bypass channel 6. As soon as the liquid level 12a drops below the lower end of conduit 13, regenerating liquid is introduced through the line 11 into the bypass channel 6.

The upper wall of connecting channel 4 is formed with an aperture 15 which is sealed by a cover or lid 14. Vertical guide elements or ways 16 extend downwardly in the walls of channel 4 to guide a composite filter 17, the latter consisting of a coarser layer 17a and of a finer layer 17b. The layers 17a, 17b are held together by an open-sided filter frame 18, and the latter is formed at its upper end with a handle or handgrip means 19 which facilitates insertion of composite filter 17 into and the latter's withdrawal from the ways 16 in the walls of connecting channel 4.

The layers 17a, 17b consist of synthetic fibers which are glued together by a suitable synthetic resin. As before stated, the filter layer or zone 17a is of comparatively coarse mesh while the other filter zone or layer 17b is of considerably finer mesh. Thus, the layer 17b will become clogged sooner than the coarser layer 17a. As the resistance of layer 17b to the flow of developing solution S through the connecting channel 4 increases, the liquid level 12 in the tank 1 rises above the liquid level 12a in the bypass channel 6. Consequently, and since the screw 7 continues to circulate the solution from channel 6 through the lower connecting channel 5 back into the tank 1, a corresponding quantity of developing solution flows over the upper side of filter 17 into the bypass channel 6. Thus, the treatment of exposed films or the like immersed in the solution S contained in tank 1 may be continued without interruption while the percentage of solids in the circulating solution rises to a certain extent, i.e. the developing solution passing over the clogged filter 17 into the channel 6 is returned by the screw 7 into tank 1 without removal of solid matter therefrom. It will be noted that the developing solution S is filtered or screened without being actually forced through the filter 17. Thus, the flow of liquid through the filter 17 is determined solely by the permeability of its layers 17a, 17b since, as soon as the filter layer 17b is clogged, the liquid is free to overflow the filter frame 18 on its way into the bypass channel 6.

The clogged filter 17, may be readily withdrawn upon removal of the lid 14 by grasping the handle 19 at the top of the filter frame 18.

The slightly modified composite filter 17' which is shown in FIG. 2 is preferably of uniform width; it comprises a downwardly tapering coarse layer 17a' and an adjacent upwardly tapering layer 17b' of finer mesh. Thus, the lower half of composite filter 17' will become clogged or filled sooner than the upper half. The frame 18' of this filter is formed at its upper end with a cutout or passage 20 which is located above the comparatively wide upper end face of coarser filter layer 17a'. Thus, even if the layer 17b' of finer mesh is completely clogged or filled with impurities and prevents the circulation of developing solution S therethrough, the solution is still at least partially separated from solid particles by passing through the coarse filter layer 17a', through the cutout 20, and into the bypass channel 6. In other words, partial filtering of the developing solution S sufficient to remove all coarser particles or flakes is insured even if the less permeable zone 17b' of the filter 17' is completely filled by removed impurities and prevents the flow of solution S therethrough. The flow of developing solution should be in a direction toward the coarser filter layer, i.e. the layer 17a or 17a' is passed by the solution before the latter advances through the finer-mesh filter layer 17b, 17b', respectively.

It will be readily understood that the filter assembly 17 or 17' may be installed in the lower transverse channel 5, if desired. When new or cleaned, the filter assemblies offer very little or no resistance to the flow of developing solution, i.e. the filtering action is practically pressureless. An additional important advantage of comparatively coarse filters is in that the are capable of storing large quantities of solid matter, i.e. that they need not be removed and cleaned at frequent intervals as the filters in presently employed filtering systems for developing fluids. It can be said that a filter of the type usually utilized in connection with gaseous fluids is very suitable for use in my novel apparatus.

The mesh size of the filters utilized in the apparatus of this invention is in the range of between about —.2 and 5 mm. For example, the filter layer 17a of FIG. 1 may be made with a mesh size of of between 1–2 mm., and the filter layer 17a' of FIG. 2 has a mesh size of between about 2–3 mm. The mesh size of the filter layers 17b and 17b' may be in the range of between 0.4–0.6 mm. It is preferred to arrange the filters 17 and 17' in a vertical plane, and the flow of the solution S is in the horizontal direction at a speed of between 0.5–5 cm. per second. Such a filtering assembly is capable of removing solid particles whose dimensions are well below the mesh size of the filter layers 17a, 17b or 17a', 17b', e.g. the filters 17, 17' are capable of effectively removing solids whose size ranges between 0.001 and 0.02 mm. While the solution S is caused to flow through the composite filter 17 or 17', the solid particles entrained thereby are caused to come into contact with say 2 or 3 fibers which is sufficient to reduce their speed to such an extent that the particles drop into the lower zones of the filters and are not entrained by the liquid passing through the exit side of the finer-mesh filter layer 17b or 17b'. Thus, despite the fact that the difference in the pressure of the solution S at the opposing sides of the composite filtering unit 17 or 17' are insignificant, the solid matter is nearly completely removed during the passage of the liquid medium therethrough.

Since the provision of aforementioned ways 16 and filter frames 18, 18', as well as the provision of readily removable cover means 14, enables an operator to inspect or interchange a filter at any stage of the operation, the treatment of exposed films or the like immersed in the developing solution S filling the tank 1 in no way affected by the interchange or inspection of filters 17, 17'. Moreover, since the filters do not completely close the passage 4, the solution may flow thereover when prevented from passing through at least one of the filter layers. In other words, the barrier formed by the filter assembly 17 or 17' is of the overflow type so that the circulation of solution S may be continued even if the filter layers are unable to take up and retain additional impurities. The upper surface of the filters should preferably remain aligned with the liquid level 12 in the developing tank 1 when the solution is free to pass through the filters.

The completely clogged filter assemblies 17, 17' may be cleaned by subjecting same to the action of a strong water jet or the like.

The developing tank 21 shown in FIG. 3 is of cylindrical cross-sectional contour. It is formed with a bottom plate 22 which is located at a distance from the ground 23 and consists of a substantially horizontal annular portion 24 as well as of a concave central portion 22a. The annular portion 24 of the bottom plate 22 supports a series of radially arranged vertical filtering units 25 each of which may be composed of two layers as the composite filter 17 of FIG. 1 or the filter 17' of FIG. 2. The upper end of tank 21 is formed with an annular flange 26 of greater diameter which defines an internal circular shoulder 26a supporting the outer ring 28 of an insert 27. The insert carries a depending central tube or column 29 which is connected to the ring 28 by a number of radially arranged spokes 30 (see FIG. 4). The lower end of tube or column 29 is connected with similar radially arranged spokes 31. The upper and lower spokes 30, 31 support a series of film holders 31' for the exposed films 32. These films are completely immersed in the developing solution S which fills the cylindrical tank 21 above the bottom plate 22. Thus, the spokes 30, 31 with the film holders 31' constitute hangers for the films 32. Of course, the exposed films may be suspended directly on the spokes 30, 31, if desired.

Adjacent to its upper end, i.e. below the upper set of spokes 30, the vertical tube or column 29 is formed with a series of elongated radially arranged closed slots 33; the upper ends of these slots extend to the liquid level 34. The entire insert 27 with its ring 28, spokes 30, 31 and tube 29 may be immersed into and withdrawn from the tank 21 by means of a handgrip member or handle 35 located above the upper end of column 29. A similar handgrip member 37 is connected to the upper side of a cover or lid 36 which is placed onto the upper end of flange 26 to seal the developing tank 21. An overflow pipe 38 extends through the cylindrical wall of tank 21 to determine the maximum height of liquid level 34. The developing solution S may be evacuated from tank 21 through the bottom plate 22 and through a discharge conduit 39 which is controlled by a valve or faucet 40.

An electric motor 41 is installed coaxially with the tank 21 beneath the latter's bottom plate 22. The motor has an upwardly extending output shaft 42 which projects through a packing gland or sealing element 44 installed in the bearing 43 which latter is inserted in a concentric bore formed in the concave portion 22a of the bottom plate 22. The upper end of shaft 42 carries a propeller screw 45 whose function is to circulate the developing solution. When the screw 45 is rotated by motor 41, the level 34 of developing solution assumes a concave shape by rising along the cylindrical wall of the tank 21, and the solution flows downwardly through the central tube 29 onto the screw 45 which latter causes the solution to flow in a circle and to thereby repeatedly pass through consecutive filter units 25 to be separated from solid matter. Thus, there is a flow of developing solution upwardly in the tank 21 and downwardly through the slots 33 and column 29, as well as a rotary flow along the cylindrical wall of tank 21. Due to centrifugal force, the solid impurities are caused to travel in a direction toward the wall of tank 21 and are collected by the vertical filter units 25.

The provision of preferably wide-mesh filtering units 25 directly in the interior of tank 21 constitutes a considerable simplification of the solution-purifying apparatus. The system of circulation-forming channels corresponding to parts 4–6 of FIG. 1 may be dispensed with, and a large number of filtering units may collect the solid matter simultaneously, i.e. the apparatus of FIG. 3 requires little attention and will operate satisfactorily for extended periods of time. In addition, large quantities of developing solution S in tank 21 are continuously moved into contact with and caused to pass through a number of filtering units which insures complete separation of coarser solids and simultaneous removal of many comparatively small impurities.

A further important advantage of the system shown in FIG. 3 is in that it occupies very little space since its component parts are installed in and below the developing tank 21. It will be understood that this apparatus may operate with a single filtering unit 25, though the provision of two or more units is preferred because the filtering action may continue even if a filter is withdrawn for inspection, cleaning or interchange by a fresh unit.

It is equally possible to connect the upper ends of filtering units 25 with the insert 27 which enables an operator to withdraw the filters whenever the insert is removed from the tank 21. Alternately, when the units 25 are loosely immersed into the tank 21, the insert 27 may comprise means, such as a system of rods or the like, which retain the filters against the tank wall so that the filters will remain stationary when the revolving solution S is caused by the screw 45 to pass therethrough. Here, again, the filters 25 offer very little resistance to the flow of developing solution, especially after cleaning. Despite their comparatively coarse mesh, the filters will always remove at least the coarser solids and will simultaneously withdraw a high percentage of comparatively small solid particles.

The developing tank 21' shown in FIG. 5 is similar to the tank 21 of FIGS. 3 and 4 with the exception that the insert 27a by itself constitutes means for maintaining the developing solution S in rotary motion. The film holders 31' and the films 32 supported therein constitute a series of blades or vanes to drive the solution toward and through one but preferably more radially arranged vertical filter units 25. The column 29 is replaced by a coaxial vertical shaft 46 whose conical lower terminal 47 extends into the complementary seat of a headed bolt 48 which is axially shiftably received in a bearing 49 supported by the bottom plate 22'. A bellows 50 is mounted between the head of bolt 48 and the bearing 49 to prevent leakage of developing solution from the tank 21'.

The lower end of bolt 48 rests upon a spiral-shaped cam disc 51 which is coupled with the worm drive 54 by means of a shaft 52. The worm drive 54 meshes with a worm wheel 52a fixed to the shaft 52 and is rotatable by an electric or like motor 53. Thus, when the motor 53 rotates the drive 54 and the latter rotates the shaft 52 over the worm wheel 52a, the spiral-shaped cam 51 lifts the bolt 48 and shaft 46 to displace the entire insert 27a in upward direction, i.e. to vibrate the insert 27a together with the film holders 31' carried by the spokes 30a and 31a. Upon continued rotation of shaft 52, the bolt 48 which acts as a follower and scans the periphery of member 51 causes the shaft 46, the films 32 and the film holders 31' to descend by gravity, and so forth. Thus, the insert 27a with film holders 31' and films 32 continuously pulsated or vibrated when the motor 53 rotates and, consequently, any solid particles which might adhere to the films 32 or the like carried by holders 31' are shaken off and thereupon caused to travel toward the radial filter units 25. The mesh size, i.e. the width of spaces between the fibers of the filter units 25 may be in the range of, say, 0.8–3 mm.

The means for rotating the insert 27a is installed in the tank cover 36a which latter is formed with a downwardly extending cupped bearing element 58 for reception and centering of the upper end of shaft 46. The cover 36a is formed with a lateral extension 36a' which latter is pivotably connected to an axle 56 carried by a bracket 55 fixed to the outer side of tank 21'. The end of extension 36a' projecting outwardly beyond the pivot axle 56 carries a counterweight 57 to facilitate the movements of cover 36a away from sealing contact with the open top of developing tank 21'. When the cover 36a is pivoted into the position of FIG. 5, the cupped bearing 58 is automatically fitted over and thereupon centers the upper end of shaft 46. The bearing 58 also supports a rotatably mounted horizontal worm wheel 59 which is driven by a worm shaft 60 rotated by a second motor 61. The worm wheel 59 carries downwardly extending axially parallel bolts or studs 62 each of which extends into the space between a pair of adjacent upper spokes 30a. Thus, the studs 62 and spokes 30a constitute two halves of a coupling over which the motor 61 is adapted to rotate the insert 27a. The entire insert acts as a pump impeller and the films 32 with their holders 31' perform the function of shovels or blades to maintain the developing solution S in rotary or circulatory motion. It will be readily understood that the studs 62 and spokes 30a constitute but one form of releasable coupling means which may be utilized for rotating the insert 27a, it being preferred that the coupling halves should be separated automatically when the cover 36a is lifted in order to permit withdrawal of the insert 27a.

In the embodiment of FIGS. 6 and 7, the worm wheel 59 is replaced by a sprocket or gear 63 whose teeth alternately mesh with the pallet of an advancing or driving pawl 64 and of a lock or arresting pawl 65, respectively. Pawls 64, 65 are constantly biased by springs 66, 67, respectively, in a direction toward the teeth of gear 63. The lock pawl 65 is controlled by a cam disc 68 which engages with its arm 65a. Cam 68 is mounted on the shaft 70 of a worm wheel 69, and the latter is rotated by the motor 61 over the worm drive 60. The shaft 70 is rotatably mounted in a bracket 71 which is carried by the cover or lid 36a and which also carires the aforementioned pawl-biasing resilient members 66, 67.

When the worm wheel 69 rotates in the direction of arrow 72 (see FIG. 6), the cam 68 first moves the lock pawl 65 away from the teeth of sprocket 63. The pawl 64 is eccentrically connected to the cam disc 68 by a pivot pin 64a and, thus, when the cam 68 continues its rotary motion in the direction of arrow 72, the pawl 64 advances the sprocket 63 a certain distance about the axis of vertical shaft 46. The sprocket 63 then rotates in the direction of arrow 63. Upon rotation of sprocket 63 through an angle of less than 180 degrees, the advancing pawl 64 is moved away from the sprocket and the inclined surface 74 of its pallet slides over the teeth of member 63. At the same time, the cam 68 releases the arm 65a of lock pawl 65 which latter then returns into mesh with the teeth of sprocket 63 under the influence of spring 67. Thus, the lock pawl 65 then arrests the sprocket 63 and in such manner prevents rotation of insert 27a. By alternately advancing and arresting the sprocket 63, the latter transmits sudden impulses to the spokes 30a over the studs or bolts 62 whereby the film holders 31' are simultaneously advanced and shaken or vibrated to circulate the developing solution and to be relieved of the particulate matter which might adhere to the films 32 inserted into the holders 31'.

An important advantage of the system shown in FIGS. 6 and 7 over the assembly illustrated in FIG. 5 is in that the motor 53 with parts 48—52 and 54 may be omitted because the means which rotates the insert 27a simultaneously imparts to the latter a series of shocks or vibratory movements in order to shake off the solid particles collecting on the films 32 in holders 31'. Thus, instead of continuously rotating and simultaneously vibrating the insert 27a, the system of FIGS. 6 and 7 causes intermittent rotation of the insert, the pulsation occurring whenever the insert is either set in motion or brought to a halt.

It will be readily understood that the insert-driving means of FIGS. 6 and 7 may be replaced by an escapement mechanism similar to that utilized in shutters for cameras and the like. Such system utilizes a two-armed lever having two noses and swingably mounted to impart sudden rotary impulses to the insert when performing rocking movements about its pivot axis. The free ends or noses of the two-armed lever may carry rollers which engage with the teeth of sprocket 63 to alternately advance and arrest same in a manner analogous to that described in connection with pawls 64, 65.

It is preferred to installed the entire driving mechanism for the insert 27 or 27a in a sealed receptacle or box. Such a gear box has not been illustrated in FIGS. 5 to 7 for the sake of clarity. However, a sealing box or tube 9a, partly broken away, is shown in FIG. 1 for the electric motor 9. The tank 1, 21 or 21' may be made of plastic (see FIG. 1) or of a suitable metallic substance (see FIGS. 3 and 5).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for removing solid particles from developing solutions for exposed films and the like which comprises, in combination: a tank having an upper end and a lower end; a supply of developing solution in the tank having an upper level; first and second connecting channel means communicating, respectively, with the upper and lower end of said tank; bypass channel means communicating with the first and second channel means and forming with the latter a passage for the flow of solution from one end of said tank through the channel means and into the other end of said tank; means in one of the channel means for circulating the solution in a direction from the upper end of the tank through said first, bypass and second channel means into the lower end of said tank at a speed of between 0.5–5 cm. per second; and filter means in said first channel means for collecting solids entrained by the circulating solution, the filter means having an upper end aligned with the upper level of solution in said tank whereby the solution overflows the filter means when the latter is clogged by the solids, and the mesh size of said filter means being in the range of between 0.2–5 mm.

2. An apparatus for removing solid particles from developing solutions for exposed films and the like which comprises, in combination: a tank having an upper end and a lower end; a supply of developing solution in the tank having an upper level; first and second connecting channel means communicating, respectively, with the upper and lower end of said tank, said first channel means having an aperture; cover means for removably sealing said aperture; substantially vertical guideways in said first channel means beneath said aperture; bypass channel means communicating with the first and second channel means and forming with the latter a passage for the flow of solution from one end of said tank through the channel means and into the other end of said tank; means in one of the channel means for circulating the solution at a speed of between 0.5–5 cm. per second in a direction from the upper end of the tank through said first, bypass and second channel means into the lower end of said tank; and filter means inserted into said guideways for collecting solids entrained by the circulating solution, the filter means having an upper end aligned with the upper level of solution in said tank whereby the solution overflows the filter means when the latter is clogged by the solids, and the mesh size of said filter means being in the range of between 0.2–5 mm.

3. An apparatus for removing solid particles from developing solutions for exposed films and the like which comprises, in combination: a tank having an upper end and a lower end; a supply of developing solution in the tank having an upper level; first and second connecting channel means communicating, respectively, with the upper and lower end of said tank; bypass channel means communicating with the first and second channel means and forming with the latter a passage for the flow of solution from one end of said tank through the channel means and into the other end of said tank; means in one of the channel means for circulating the solution at a speed of between 0.5–5 cm. per second in a direction from the upper end of the tank through said first, bypass and second channel means into the lower end of said tank; and filter means in said first channel means for collecting solids entrained by the circulating solution, the filter means having an upper end aligned with the upper level of solution in said tank whereby the solution overflows the filter means when the latter is clogged by the solids, said filter means consisting of synthetic fibers and a synthetic resin for bonding the fibers, and the mesh size of the filter means being in the range of between 0.2–5 mm.

4. An apparatus for removing solid particles having sizes ranging between 0.001 and 0.02 mm. from developing solutions for exposed films and the like which comprises, in combination: a tank having an upper end and a lower end; a supply of developing solution in the tank; channel means communicatively connected to the upper and lower ends of the tank for providing a passage through which the solution is adapted to flow, said channel means having a substantially horizontal portion; means for circulating the solution from said tank through the channel means and back into the tank at a speed of between 0.5–5 cm. per second; and filter means in the horizontal portion of said channel means for slowing down and for collecting at least the coarser solids entrained by the circulating solution, said filter means consisting of at least two layers of different mesh, and the mesh size of said layers being in the range of between 0.2–5 mm. whereby the filter means offers small resistance to the flow of and reduces only slightly the speed at which the solution is circulated through the same.

5. An apparatus for removing solid particles having sizes ranging between 0.001 and 0.02 mm. from developing solutions for exposed films and the like which comprises, in combination: a tank having an upper end and a lower end; a supply of developing solution in the tank; channel means communicatively connected to the upper and lower ends of the tank for providing a passage through which the solution is adapted to flow, said channel means having a substantially horizontal portion; means for circulating the solution from said tank through the channel means and back into the tank; at a speed of between 0.5–5 cm. per second; and filter means in said horizontal portion for slowing down and for collecting at least the coarser solids entrained by the circulating solution, said filter means consisting of two layers of different mesh, the layer of finer mesh being disposed rearwardly of the other layer, and the mesh size of said layers being in the range of between 0.2–5 mm. whereby the filter means offers small resistance to the flow of and reduces only slightly the speed at which the solution is circulated through the same.

6. An apparatus for removing solid particles from developing solutions for exposed films and the like which comprises, in combination: a tank having an upper end and a lower end; a supply of developing solution in the tank having an upper level; first and second connecting channel means communicating, respectively, with the upper and lower end of said tank; by-pass channel means communicatnig with the first and second channel means and forming with the latter a passage for the flow of solution from one end of said tank through the channel means and into the other end of said tank; means in one of the channel means for circulating the solution at a speed of between 0.5–5 cm. per second in a direction from the upper end of the tank through said first, bypass and second channel means into the lower end of said tank; and filter means in said first channel means for collecting solids entrained by the circulating solution, the filter means having an upper end aligned with the upper level of solution in said tank whereby the solution overflows the filter means when the latter is clogged by the solids, the filter means consisting of two layers of different mesh, the layer of coarser mesh being closer to the tank than the other layer, and the mesh size of said layers being in the range of between 0.2–5 mm.

7. An apparatus for removing solid particles from developing solutions for exposed films and the like which comprises, in combination: a tank having an upper end and a lower end; a supply of developing solution in the tank having an upper level; first and second connecting channel means communicating, respectively, with the upper and lower end of said tank; bypass channel means communicating with the first and second channel means and forming with the latter a passage for the flow of solution from one end of said tank through the channel means and into the other end of said tank; means in one of the channel means for circulating the solution at a speed of between 0.5–5 cm. per second in a direction from the upper end of the tank through said first, bypass and second channel means into the lower end of said tank; and filter means in said first channel means for collecting solids entrained by the circulating solution, the filter means having an upper end aligned with the upper level of solution in said tank whereby the solution overflows the filter means when the latter is clogged by the solids, the filter means consisting of two layers of different mesh, the layer of coarser mesh being closer to the tank than the other layer and said layers tapering in opposed vertical directions, the width of the coarser layer being greater at the upper end of said filter means, and the mesh size of said layers being in the range of between 0.2–5 mm.

8. An apparatus for removing solid particles from developing solutions for exposed films and the like which comprises, in combination: a tank having an upper end and a lower end; a supply of developing solution in the tank having an upper level; first and second connecting channel means communicating, respectively, with the upper and lower end of said tank; bypass channel means communicating with the first and second channel means and forming with the latter a passage for the flow of solution from one end of said tank through the channel means and into the other end of said tank; means in one of the channel means for circulating the solution at a speed of between 0.5–5 cm. per second in a direction from the upper end of the tank through said first, bypass and second channel means into the lower end of said tank; and filter means of uniform width in said first channel means for collecting solids entrained by the circulating solution, the filter means having an upper end aligned with the upper level of solution in said tank whereby the solution overflows the filter means when the latter is clogged by the solids, and the mesh size of said filter means being in the range of between 0.2–5 mm.

9. An apparatus for removing solid particles from developing solutions for exposed films and the like which comprises, in combination: a tank having an upper end and a lower end; a supply of developing solution in the tank having an upper level; first and second connecting channel means communicating, respectively, with the upper and lower end of said tank; bypass channel means communicating with the first and second channel means and forming with the latter a passage for the flow of solution from one end of said tank through the channel means and into the other end of said tank; means in one of the channel means for circulating the solution at a speed of between 0.5–5 cm. per second in a direction from the upper end of the tank through said first, bypass and second channel means into the lower end of said tank; and filter means in said first channel means for collecting solids entrained by the circulating solution, the filter means having an upper end aligned with the upper level of solution in said tank whereby the solution overflows the filter means when the latter is clogged by the solids, the filter means consisting of two layers of different mesh, the layer of coarser mesh being closer to said tank than the other layer, and the layer of coarser mesh tapering in downward direction whereby the maximum width of said last mentioned layer is at the upper end of said filter means, and the mesh size of said filter means being in the range of between 0.2–5 mm.

10. An apparatus for removing solid particles from developing solutions for exposed films and the like which comprises, in combination; a tank having an upper end and a lower end; a supply of developing solution in the tank having an upper level; first and second connecting channel means communicating, respectively, with the upper and lower end of said tank, the first channel means having an aperture; cover means for removably sealing said aperture; substantially vertical guideways in said first channel means beneath said aperture; bypass channel means communicating with the first and second channel means and forming with the latter a passage for the flow of solution from one end of said tank through the channel means into the other end of the tank; means in one of said channel means for circulating the solution at a speed of between 0.5–5 cm. per second in a direction from the upper end of the tank through the channel means and into the lower end of said tank; and filter means comprising a frame inserted into said guideways and having an upper end aligned with the upper level of the solution in said tank, and at least two vertical layers of different mesh in said frame, the layer of coarser mesh being closer to the tank than the other layer, said layers collecting the solids entrained by the solution passing through said filter means and the solution being free to overflow the frame when at least one layer is clogged by the solids, the mesh size of said layers being in the range of between 0.2–5 mm.

11. An apparatus for removing solid particles from developing solutions for exposed films and the like which comprises, in combination: a tank having an upper end and a lower end; a supply of developing solution in the tank having an upper level; first and second connecting channel means communicating, respectively, with the upper and lower end of said tank, the first channel means having an aperture; cover means for removably sealing said aperture; substantially vertical guideways in said first channel means beneath said aperture; bypass channel means communicating with the first and second channel means and forming with the latter a passage for the flow of solution from one end of said tank through the channel means into the other end of the tank; means in one of said channel means for circulating the solution at a speed of between 0.5–5 cm. per second in a direction from the upper end of the tank through the channel means and into the lower end of said tank; and filter means comprising a frame inserted into said guideways and having an upper side aligned with the upper level of solution in said tank, and at least two vertical filter layers of different mesh in said frame, the layer of coarser mesh being closer to the tank than the other layer and the frame having a cutout above the coarser layer, said layers collecting the solids entrained by the solution passing through said filter means and the solution being free to overflow the frame when both said layers are clogged by the solids whereas, when only the layer of finer mesh is clogged, the solution flows through the other layer, through said cutout, over the layer of finer mesh and into said bypass channel means, the mesh size of said layers being in the range of between 0.2–5 mm.

12. An apparatus for removing solid particles from developing solutions for exposed films and the like which comprises, in combination: a tank for receiving a supply of developing solution; means for circulating at least a portion of the solution at speeds of between 0.5–5 cm. per second; and filter means located in the path of and adapted to collect the solids entrained by the circulating solution, said filter means comprising a first layer consisting of synthetic fibers of relatively coarse mesh, a second layer adjacent to the first layer and consisting of synthetic fibers of a mesh finer than the mesh of said first layer, the mesh size of said layers being in the range of between 0.2–5 mm., and a frame for said layers, the frame having two open sides, an end and a cutout in said end for exposing a portion of said first layer whereby a fluid passing in a direction toward and through the first layer is free to pass through said cutout when said second layer is clogged.

13. An apparatus for removing solid particles from developing solutions for exposed films and the like which comprises, in combination: a tank for receiving a supply of developing solution; means for circulating at least a portion of the solution at speeds of between 0.5–5 cm. per second; and filter means located in the path of and adapted to collect the solids entrained by the circulating solution, said filter means comprising a first layer consisting of synthetic fibers of relatively coarse mesh, a second layer adjacent to the first layer and consisting of synthetic fibers of a mesh finer than the mesh of said first layer, the width of said layers tapering in opposing directions and the mesh size of said layers being in the range of between 0.2–5 mm., and a frame for said layers, the frame having two open sides, an end adjacent to the maximum-width zone of said first layer and a cutout in said end for exposing a portion of said first layer whereby a fluid passing in a direction toward and through the first layer is free to pass through said cutout when said second layer is clogged.

References Cited in the file of this patent

UNITED STATES PATENTS

| | | |
|---|---|---|
| 909,484 | Van Auken | Jan. 12, 1909 |
| 1,158,034 | Emanuel | Oct. 26, 1915 |
| 1,561,602 | Gauss | Nov. 17, 1925 |
| 1,634,463 | Hills | July 5, 1927 |
| 1,987,847 | Flood | Jan. 15, 1935 |
| 2,168,846 | Parker | Aug. 8, 1939 |
| 2,383,086 | Sebold | Aug. 21, 1945 |
| 2,781,914 | De Voe | Feb. 19, 1957 |
| 2,854,141 | Barnstead | Sept. 30, 1958 |
| 2,862,432 | Schiller | Dec. 2, 1958 |

FOREIGN PATENTS

| | | |
|---|---|---|
| 245,703 | Switzerland | Oct. 16, 1947 |